United States Patent [19]

Pridemore et al.

[11] Patent Number: 5,630,785

[45] Date of Patent: May 20, 1997

[54] PROCESS FOR THE TREATMENT OF WASTE PRODUCTS

[75] Inventors: Dennie E. Pridemore, Boulder, Colo.; Harald W. Kremnitz, Laguna, Philippines

[73] Assignee: Hydromex Inc., Boulder, Colo.

[21] Appl. No.: 405,245

[22] Filed: Mar. 15, 1995

[51] Int. Cl.$^6$ .............................. A62D 3/00; B09B 3/00; G21F 3/00

[52] U.S. Cl. ................ 588/255; 588/18; 588/252; 588/256; 588/257; 405/128

[58] Field of Search ........................... 588/18, 20, 252, 588/255, 256, 257; 405/128; 210/751

[56] References Cited

U.S. PATENT DOCUMENTS

| | | | |
|---|---|---|---|
| 4,689,178 | 8/1987 | Gay et al. | 588/18 |
| 4,770,783 | 9/1988 | Gustavsson et al. | 210/751 X |
| 4,877,558 | 10/1989 | Morioka et al. | 588/18 |
| 5,207,532 | 5/1993 | Mason et al. | 588/252 X |
| 5,268,128 | 12/1993 | Lahoda et al. | 588/20 |
| 5,330,658 | 7/1994 | Grant et al. | 588/18 X |
| 5,434,331 | 7/1995 | Barkatt et al. | 588/20 X |
| 5,523,515 | 6/1996 | Milner | 588/20 X |

*Primary Examiner*—George A. Suchfield
*Attorney, Agent, or Firm*—Kyle W. Rost

[57] ABSTRACT

In this process for the treatment of waste products, the waste products are separated in a first and a second group with respective pH-value of maximum 7 or higher than 7. The waste products of the first group are made increasingly acid whereas those of the second group are basified. This is done by adding an acid to the first group and a base to the second group in order to obtain a pH-value of maximum 5 for the first group and a pH-value of minimum 8 for the second group. An oxidant and metallic precipitating reagents are added to the first group of waste products. The thus treated waste products are combined in an alkaline mixture that is absorbed in a polymeric matrix by adding reaction components for the formation of a polymeric matrix.

20 Claims, 1 Drawing Sheet

OXIDATIVE DECHLORINATION OF A CHLORINATED BIPHENYL

OXIDATIVE DECHLORINATION OF A CHLORINATED BIPHENYL

PROCESS FOR THE TREATMENT OF WASTE PRODUCTS

TECHNICAL FIELD

The present invention relates to a process for total waste management. Any kind of organic or inorganic solid waste, be it metals, stones, asbestos, batteries, wood and other vegetable wastes, fecal matter, slaughter waste, plastic, tires, textile, fibers, household wastes, chemical wastes, industrial wastes, pharmaceutical and hospital wastes, drugs, fly ash and bottom ash from incinerators, slags, filter cakes, sediments, contaminated land, and any mixture thereof, and any kind of organic or inorganic liquid or suspended waste, be it sludge, drab, sewage, paint, oils, solvents, industrial acid or alkaline liquid wastes, and any blend thereof, including any hazardous waste, can be dealt with by this invention. The wastes are processed and converted by the invented process into a sterile, neutral, non-odorous, non flammable and environmentally stable solid composite-type end-material which can be safely deposited at landfills or be used as recycled composite raw material for construction purposes.

BACKGROUND ART

This invention bears upon a process for the treatment of waste products, in which liquid and solid substances are separated after which reaction components for the formation of a polymeric matrix are added in order to be assimilated in the chain of the polymeric matrix. Such a process has been known in the patent application PCT/EP 89/00525. In this known process a filler consisting of two components, one with N-groups and the other with OH-groups is added to the waste product as a synthetic resin in order to have the waste product assimilated in the polymeric matrix. In this way any harmful substances are compounded so much so that they can be less easily leached and thus be better stored, enabling them to be re-used as raw material for another product. The disadvantage of this process lies however in the fact that the harmful substances are only quasi encased instead of being degraded. Furthermore the extent to which the waste products are encased largely depends on the nature of he product, i.e. the products do not always sufficiently participate in the polymeric chain formation.

The objective of this invention is to achieve a better participation in the polymeric chain formation so much so that the waste products' absorption in the polymeric matrix is less dependent on the nature of the products that are to be processed.

To achieve the foregoing and other objects and in accordance with the purpose of the present invention, as embodied and broadly described herein, the method of this invention may comprise the following.

DISCLOSURE OF INVENTION

According to the invention, in a process for the treatment of waste products, first, liquid and solid waste products are separated. Second, reagents for formation of a polymeric matrix are added to the waste products, such that the waste products are absorbed in the chain of the polymeric matrix. Specifically, prior to forming the polymerize matrix, the liquid wastes are further divided into a first group of liquids with a pH-value of 7 at the most, and a second group of liquids with a pH-value higher than 7. A first mixture is prepared by adding to the first group of liquids, as may be required, pH adjusting reagents sufficient to produce a resulting pH-value of no more than 5, plus an oxidant. In addition, metallic precipitating agents are added, as may be required, sufficient to precipitate metals. Also prior to forming the matrix, a second mixture is prepared of said solid waste products and liquid of the first mixture, and pH adjusting reagents are added, as may be required, sufficient to produce a resulting pH-value of at least 8 in the second mixture. Still prior to forming the matrix, a third mixture is prepared of the second group of liquids and the second mixture. The content of the third mixture is allowed to react, and pH adjusting reagents are added, as may be required, sufficient to produce a resulting pH-value of at least 7. The matrix then is formed by adding the reagents for formation of the polymeric matrix to the third mixture.

According to further aspects of the invention, a waste mixture is treated in a multi-step process including the following:

1. First treatment of liquid waste under acidic and oxidizing conditions;
2. Second treatment of liquid waste by adding salts of transition metals;
3. Third treatment of liquid wastes by a first treatment with heavy metal precipitants;
4. Fourth treatment of liquid waste under alkaline conditions, causing precipitation of most of the metal ions, and adding of concrete building additives and other additives;
5. Reaction forcing, material compressing and transporting, by a first high pressure treatment;
6. Post-treatment with heavy metal complexing and precipitating agents;
7. Adding of the polyurethane or polyureacondensate monomers as structure forming reagents;
8. End-process for forming end products by a second high pressure treatment.

In addition, the process has a capability to process certain radioactive waste. The end uses of the product created in this product include many types of building products and energy storage blocks.

The accompanying drawings, which are incorporated in and form a part of the specification illustrate preferred embodiments of the present invention, and together with the description, serve to explain the principles of the invention. In the drawings:

BRIEF DESCRIPTION OF THE DRAWINGS

In the drawing FIGURE.

BEST MODE FOR CARRYING OUT THE INVENTION

Figure 1:
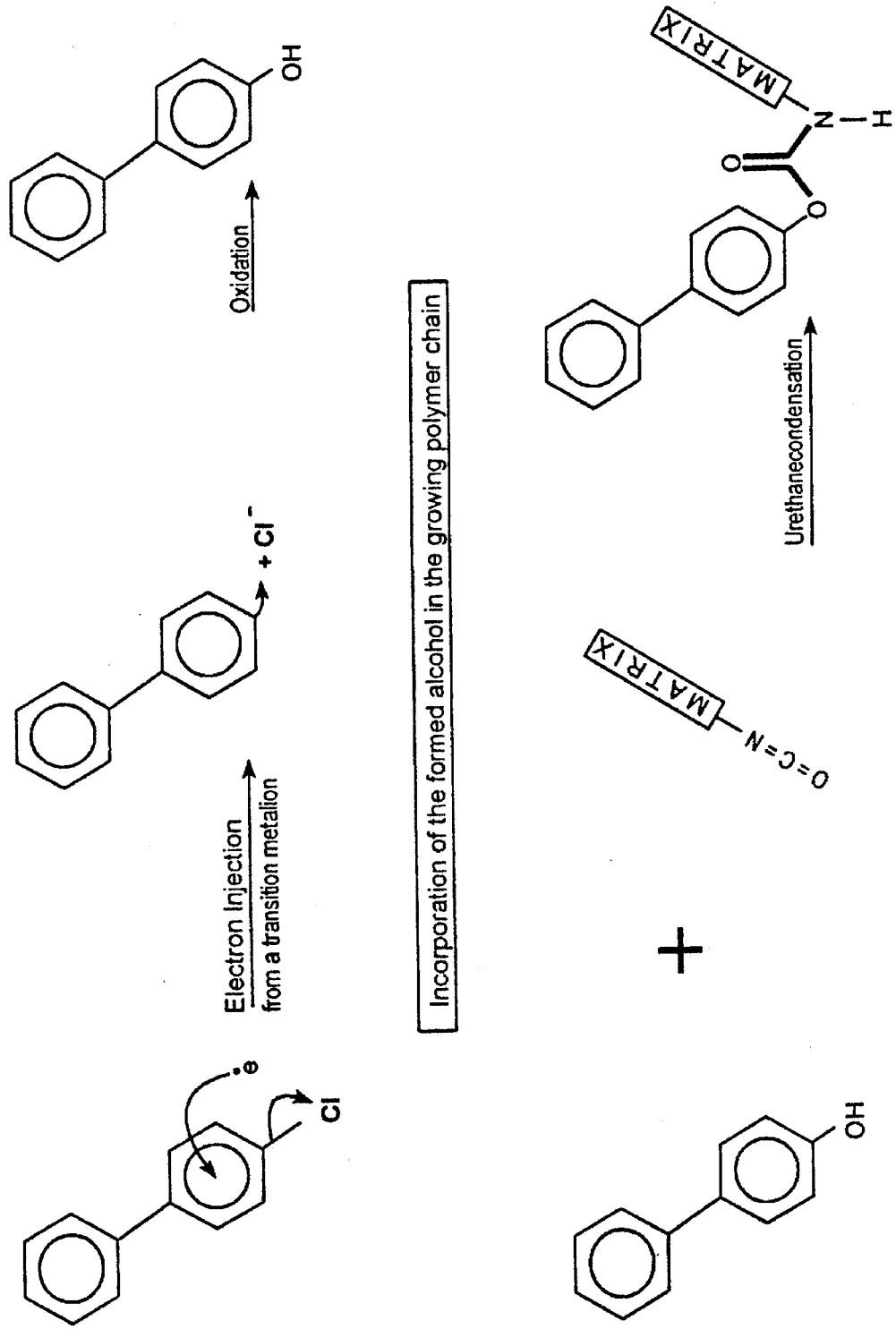
FIG. 1 illustrates an example of forming a polymer chain.

This process is a multiple chemical, thermal and mechanical treatment of the wastes. The waste components are molecularly reorganized into stable and environmentally safe compounds, and immobilized by several means including a direct incorporation, impregnation and/or encapsulation in a polymer manix.

A characteristic of this invention's process is that the liquid waste products are further separated in a first group of liquids with a pH-value of 7 at most and a second group of liquids with a pH-value that exceeds 7. After being separated the waste products are submitted to a preliminary treatment as described below:

a) Prepare a first mixture by:
   (i) checking the pH-value of the liquid belonging to the first group. The value should be 5 at most. Should the pH-value be higher than 5, then the acidity of the liquid of this first group must be increased until a value of five at most is obtained;
   (ii) adding an oxidant to the liquid of this first group:
   (iii) checking whether the liquid of this first group contains a preset amount of metallic precipitating reagents and adding salts of metallic precipitation reagents to the liquid of this first group if the preset amount is not present;
b) Prepare a second mixture composed of the solid waste products and the liquid of the above second group. Check if the pH-value of this second mixture stands at least 8. Should the pH-value be lower than 8, a base must be added to this third mixture in order to obtain a pH-value above 8; alternatively, the second mixture is prepared of the solid waste products and liquid of the first mixture;
c) Prepare a third mixture by combining the fast and the second mixture and letting them react. Check if the pH-value of this third mixture exceeds 7. Should the pH-value be below 7, a base must be added to this third mixture in order to obtain a pH-value above 7. Alternatively, prior to forming the matrix, the third mixture is prepared of the second group of liquids and the second mixture.
d) Add the above mentioned reaction components for the formation of the polymeric matrix to the third mixture.

By submitting the waste product of the first group to a preliminary acid treatment, the cellular structure of the waste products to be processed is at least partially degraded, which will enable in a later stage a better absorption in the polymeric matrix. Adding an oxidant also stimulates this cellular degradation, which gives the final product a more stable structure. The salts of the metallic precipitation reagents see to it that a precipitate is formed, which decreases the amount of soluble substances. This in its turn improves the absorption in the polymeric matrix. Furthermore these salts contribute to the oxidation process and function thus as a catalyst for the oxidant. The advantage of basifying the solid waste products is that exothermic reactions occur, which will cause a rise in temperature stimulating further reactions. Adding a base also positively affects the third mixture because the acid first mixture will react with the alkaline second mixture. This will improve the bond between the various components in the mixture.

As the third mixture's pH-value is alkaline, the participation in the polymeric chain formation is improved. Thus the harmful substances are better bound in the polymeric matrix and this less liable to being leached. By submitting waste products to a preliminary treatment the final product becomes considerably less dependent on the waste product supplied and the absorption in the polymeric matrix is improved.

A first implementation of this process according to the invention is to compress the third mixture by means of a pressure of at least 25 Bar before adding the above mentioned first reaction components. Compressing preferably is done by using the pressure which is built up during the reactions themselves. This results in a more compact final product. On top of that the intermolecular forces increase thanks to the compression, which positively affects the molecular bond.

A second implementation of the process according to the invention is to check the third mixture on the presence of free heavy metals. If the mount of heavy metals found exceeds a preset limit, complex-forming precipitating reagents must be added. As free heavy metals are extremely harmful, they are to be bound with great care. Adding complex-forming precipitating reagents improves the precipitate of these heavy metals, which facilitates the absorption in the polymeric matrix. It is preferable to use ferri-ferrous chloride or sulfate as precipitating reagents. Theses reagents are cheap and result in a negligible contamination. It is also preferable to use at least one of the reagents $CrO_3$, $Na_2Cr_2O_7$, $KMnO_4$, $FeCl_3$ or $Fe_2(SO_4)_3$. These reagents positively affect the oxidation process.

A third implementation of the process according to the invention is to use an oxide or carbonate of the group Ia on IIa as a base. The advantage is that the soluble metal salts present in the third mixture are converted in soluble metal hydroxide. It is also positive to use a calcic base. This is a cheap product and the calcium salts formed after the reaction are very water absorbent, which positively affects the water regulation. It is favorable to add phase transition catalysts apart from the above mentioned base. This stimulates the anion's transition from a watery to an oil phase.

A fourth implementation of the process according to the invention is to compress the third mixture while transferring it to a reactor in which the absorption in the polymerize matrix takes place. Transport and compressing occur simultaneously.

A fifth implementation of the process according to the invention is to use polyurethane as a reaction component. This is a cheap substance for this purpose. It is favorable to use one of the substances containing ether amine, cycloaliphatie amine or hydroxylic amine as polymerization catalyst. Theses substances are sometimes present in the waste product itself. It is recommendable to use one of the reagents phosphoric acid, boric acid, humic acid, uric acid, acetic alcohol polysaccharide, polyvinylalcohol or aluminum salt as complex-forming precipitation reagents. Thus a product is created that may be used for hydroponic cultivation.

A sixth implementation of the process according to the invention is to check prior to the treatment whether the waste product contains a lot of metal. If this is the case, the waste product treated may be heated in order to allow the metals to oxidate.

Afterwards the product is compressed into hydrogen-rich blocks. Thus the waste products processed have a high calorific value, which makes them extremely suitable for energy storage. As the encased waste products have been made unharmful, environmentally sound combustion is possible.

The invention will now be described in greater detail.

On processing waste products following the invention's process the nature of the waste product is of no importance. Waste products of different nature and origin can be treated. In view of this great diversity of waste products, it is very important to submit the products to a preliminary treatment and to separate them in order to allow the fight chemical reactions to take place and to avoid uncontrolled reactions.

The waste products to be processed are separated, depending on their nature. First the solid substances are separated from the liquids. The liquids are then divided in a first group of liquids with a pH-value of 7 at most and a second group of liquids with a pH-value above 7. A further division is possible by separating the water-insoluble substances and the water-suspended ones. The solid substances are preferably divided into explosive and non-explosive substances. This of course is namely done for reasons of security. If the waste products contain fly ash, they are preferably turned into a suspended solution prior to treatment.

After having separated the products the treatment may be started. When processing waste products it is of no importance which products are treated first: the products of the first or the second group or the solid substances. If so desired the products can be treated simultaneously.

When treating the liquids of the first group, the pH-value of the liquid of this first group is measured. This value must not be higher than 5. If the pH-value is higher than 5, the acidity of liquid of this first group must be increased until the pH-value stands at 5 at most. If the substances have been divided into water-insoluble or suspended substances, then again, if necessary, the acidity is increased. It is recommendable to use a strong inorganic acid because this enables a quicker reaction. Nitric acid, sulfuric acid, perchloric acid or a mixture of these very well serves the purpose.

Notably, those acids or any other reagent used on implementing the process according to the invention, do not need to have a high degree of purity. They may well be present in the waste product to be processed, so much so that it is merely necessary to adjust their concentration. Liquid organic wastes usually occur in the shape of emulsions. A micro-cellular structure functions as a protective layer. Using an acid mainly aims at degrading these emulsions. Thanks to this preliminary treatment it is easier to treat the substances. Increasing the acidity also enables a partial hydrolysis of the hydrolyzable organic components, through which esters and ether-like molecules are degraded to smaller components. Sometimes oxygen-like complexes occur during these reactions.

Apart from increasing the acidity, if necessary, as described above, an oxidant is added to the liquid of this first group in order to make a first mixture. Suitable reagents include a molecular halogen, $O_2$ or $O_3$, known as very strong oxidants.

Under certain conditions it may be useful to increase the acidity first and then add an oxidant. For example if the waste contains amine- or alcohol-like substance, this will be reduced to carbon-carbon bonds or carbon-heteronuclear double bonds, which are more susceptible to oxidizing agents. Adding an oxidant makes the thus formed first mixture more stable as the oxidation process is stimulated. Stable insoluble complexes are formed that will react with other reagents added later, as described below. Moreover volatile chlorous waste such as PCB, chlorous dioxine, and benzofuran can be treated by means of oxidative dechlorination.

Although adding an acid to begin with is very unusual in view of the conservation of the final product, particularly in combination with an oxidant it does have a positive effect because it enables the degradation of the waste product, which in its turn enables later processing that leads to a more stable final product. It is preferable to add a substance that functions both as an acid and an oxidant. For example nitric acid and perchloric acid may be used. The acid concentration preferable ranges from 1 to 100% per volume.

The liquid of the first group is examined in order to check whether a preset amount of metallic precipitating reagents is present. If the preset amount is not present in the liquid, salts of metallic precipitating reagents are added to the liquid of this first group. Preferably iron (I) or (II) chloride or sulfate is added with a concentration ranging from 1 to 10% per volume. Also salts of $CrO_2$, $Na_2Cr_2O_7$, $KMnO_4$, $Fe_2(SO_4)_3$ are suitable, as they contain an oxidating agent as well. Although such salts of metallic precipitating reagents may lead to contamination, they contribute to the complex-formation in which the binding agents are bound to metals by means of oxygen. In this way, less double complexes and more stable salts are formed that precipitate more easily, which facilitates, in a later stage, their isolation and processing.

The salts function as catalyst to stimulate among other things the oxidation of the organic components of the waste products. It is recommendable to use superior transition metals as this positively affects the complex-formation. The salts of the metallic precipitating reagents are preferably added after the acidity of the liquid of the first group has been increased. If the acid were added later, this would affect the existing emulsions to a smaller extent. The salts of the above reagents form thermodynamic stable salts and complexes with the waste products neated. In this way bonds with oxygen molecules are formed. The fact that most of these salts are water-insoluble will result in precipitates, which positively affects the later absorption. A number of these reactions will take place at room temperature. This will cause other reactions that will only take place in a later stage of the treatment when the temperature and the pressure have risen.

The waste products that are to be treated may be contaminated by heavy metals. If this is the case, the waste product is to be submitted to a preliminary treatment in order to achieve an adequate absorption of these heavy metals in the final product. On implementing the process according to the invention, these heavy metals, which usually occur in the form of ions, are fast converted into rather insoluble salts or complexes by adding precipitation reagents, for example phosphoric acid may be added to precipitate insoluble phosphates or boric acid to turn the metal ions into a crystalline polymeric bode substance. Humic acid may also be added to form chelate compounds, polysaccharides, polyvinyl alcohol or tannins.

The liquid of the second group, with a pH-value higher than 7, is mixed with the solid waste products in order to obtain a second mixture. It is preferable to grind the solid waste products first, e.g. by means of a mill. In order to avoid overheating of this mill, it is preferable cooled by means of nitrogen, released in the further stages of this process. Thus external nitrogen need not be added and the generated nitrogen is used to our advantage. The nitrogen generated can also be used as neutralizing and cooling agent in further stages of the process as well.

The pH of the second mixture is now measured. If the pH-value is below 8, a base is added to the second mixture in order to obtain a pH-value of at least 8 for this second mixture. It is recommendable to add calcium oxide in dry, unslaked powder form as a base. A pH-value of 8 is a minimum; it is preferable to basify the mixture to such an extent that the pH-value stands at 10 to 14. Other alkaline reagents that may be used, are oxides or carbonates from the Ia or IIa group of elements such as potassium hydroxide and calcium carbonate. Calcic reagents are preferred as the calcium salts created during the reaction are to a large extent hygroscopic and thus have regulative function concerning the water absorption. This results in an over saturation of the partially water-soluble salts which will quickly crystallize out. Adding a base results in a temperature increase as a consequence of the reaction's exothermic nature.

The first mixture (the one obtained after the preliminary treatment of the liquid of the first group) is now mixed with the second mixture in order to obtain a third mixture. The pH-value of the third mixture must be higher than 7. Therefore it is checked whether this third mixture is alkaline; if not a base is added. The advantage of mixing the first and the second mixture only at this stage is that the acidic first mixture will now react with the alkaline second mixture, which stimulates salt formation. Moreover the exothermic nature of the second mixture will positively affect the first mixture, which, as mentioned above, induces further reactions in the first mixture that encourage precipitation. The alkaline nature of the second mixture stimulates the conversion of soluble metal salts of the first mixture into insoluble metal hydroxides. The solid substance of the second mixture is polyelectric, which encourages the adsorption and absorption of the organic molecules and other precipitates. It is recommendable to use phase transition catalysts. This stimulates the anion's transition from an aqueous to an oily phase. Examples of suitable reagents include phosphonium salt, amines or polyethers.

The reactions in this stage can be compared to those taking place when making concrete. It is possible to add additives such as hardening agents or water reduction substances in order to stimulate the solidification of the substances in treatment.

Depending on the nature of the waste products and the reagents used, pressure will be built up during the reaction that positively influences the intermolecular forces and thus the intermolecular bonds. This pressure can be increased by compressing the third mixture under a minimum 25 Bar pressure. The third mixture is preferably compressed while being transferred to another reactor in which further reactions will take place. In this way transport and compression coincide. If the pressure built up during the reaction is sufficient, it is possible to transport by means of this pressure, without adding external pressure. As a consequence of this generation of pressure a stable, viscous mixture is formed.

If the waste product to be treated is to a large extent contaminated by salts of heavy metals that after the above described preliminary treatment still remain soluble, such as zinc, cadmium or mercury, the product is to be submitted to a further preliminary treatment in order to guarantee its absorption in the final product.

The third mixture is checked for the presence of free heavy metals. If a preset limit is exceeded, complex-forming precipitating reagents are added to the third mixture, such as humic acid or uric acid. The quantity of the reagents added is determined in terms of the extent to which the preset limit is exceeded. The presence of such contaminators can be determined by way of a leach test.

As described above, the third mixture, a result of the preliminary treatment, is transferred by pumping to another reactor where it will be treated further. This treatment mainly consists in adding reaction components to the third mixture in order to form a polymeric matrix. These components are formed by polyol- and isocyanatic materials, mainly polyurethane and isocyanates. A polymerization catalyst may be added, e.g., a polyisocyanate such as toluene-2, 4-diisocyanate, diphenylmethane-4, 4' diisocyanate, polyalcohol or polyamines containing polysacchaddes. Ether amine-like, cyclo-aliphatic amine-like or hydroxilic amine-like substances and dimethylaminopyddine are used as a catalyst.

After adding the reaction components, the pressure within this other reactor is preferably increased, that is if the internal pressure is too low in order to stimulate the participation in the polymeric chain formation and to obtain a stable final product. Under high pressure of, e.g., 200 Bar, ionic and radical reactions between organic and inorganic components are positively affected. This reaction takes place at a high temperature, e.g. 200° Centigrade, as a consequence of the exothermic polycondensation. Thanks to this high temperature it is possible to cross the potential bridge, necessary for the formation of the polymeric matrix.

The general objective of the preliminary treatment that the waste products are submitted to, is to create more favorable conditions for the participation in the formation of the polymeric chain, which is to take place in this stage of the process. The alkaline third mixture has a pH-value of approximately 9, the buffer capacity of the substances present in this mixture has been optimally used which render this third mixture more stable and more suitable for absorption in the polymeric matrix.

The ions of the added or already present transition metals will act as a catalyst in the reaction. The following example illustrates the reaction sequences. With reference to the upper row of FIG. 1 of the drawings, a chlorous biphenyl is used as a reaction component for the formation of the polymeric matrix. Due to the ion of the transition metals, an electron is injected in the chlorous biphenyl. This electron-injection separates a chlorine-ion, which leads to the creation of a radical. Due to the presence of the oxidant, the high pressure in the third mixture, and the alkaline nature of this mixture, the thus created radical will easily oxidam through absorption of an OH-ion and will assume an alcohol-like structure. This alcohol-like structure is more stable and more environmentally sound. With reference to the lower row of FIG. 1, when this structure reacts with a polymeric chain such as O—C—N-MATRIX, a new structure, illustrated at the end of FIG. 1, is formed through urethane condensation.

As can be seen in the ultracondensation product, the chlorinated biphenyl absorbed in the polymeric matrix and is directly combined with the polymeric chain, resulting in a stable and inert final product. Leach tests run on the thus obtained final product show that strong bonds have been formed as the amount of material leached was minimal.

In this process organic and inorganic polymerization combines because during the preliminary treatment, both with the solid substances and the liquids, inorganic and organic matters were treated and made to react. In this stage of the reaction nitrogen gas is released as a consequence of the decomposition processes that take place. The nitrogen compounds, mainly present in organic waste are decomposed and degraded, which sets free nitrogen gas that, as already mentioned, is used for cooling or security purposes in other stages of this process.

The process according to the invention is preferably implemented in a closed loop system, so much so that the processed waste products that have insufficiently reacted can be reprocessed in order to let them react further. The decision to let the. products react again may be based on a visual examination of the final product that shows too much unevenness, which gives evidence of insufficient reactions.

The final product obtained by implementing the process according to the invention can assume various shapes. The final product may, e.g., consist of plates that can be used as soil stabilization or sound-proofing screens. The final product will also depend to some extent on the nature of the waste products supplied. If the waste products contain highly calorific matters, such as plastic, rubbers or solvents, the final products can act as an energy carrier. The process may even be adjusted in order to obtain a highly calorific final product that is fit to be used as fuel for blast furnaces or other processes for which high temperatures are needed. If the waste that is to be processed contains a lot of metals, the final product will contain a lot of hydrogen resulting from the oxidation during processing. This hydrogen acts as combustible, highly calorific matter. Through combustion at high temperature the water present in this material will be released and react with the free materials. The oxidation of these free metals will lead to the generation of hydrogen.

As there has been a good absorption in the polymeric matrix, thanks to the preliminary treatment, the final product can also be stored without any risk of contamination due to leaching. Radio-active materials may be absorbed as well, in particular if the waste contains a lot of metals that can act as an absorption screen for radio-active radiation.

The preliminary treatment to which the waste products have been submitted contributed to the successful absorption in the polymeric chain so much so that an actual absorption in the polymeric matrix takes places and not merely an encasing of the waste products. The final product obtained by implementing the invention becomes considerably more stable and chances that the absorbed waste product will be leached are minimal.

Because of the enormous number of different molecules present in waste, a detailed knowledge of every ongoing reaction in the waste handling procedures of the invented process can never be possible. However, a division in type of reactions occurring at the several stages of the process is feasible; this is commented in the following description of the several treatment stages of the process.

1. First Treatment of liquid waste: acidic and oxidizing conditions.

A) Reasons for acidic conditions

Structurally, many liquid organic wastes are emulses. Such micro cellular structures protect the inside contents against attack by the reagents used in the process. Acidic treatment breaks down emulses (flocculation); the contents are then more susceptible for treatment. Acidic treatment is necessary for partial hydrolysis of the hydrolyzable organic contents in the waste: e.g., complex ester and ether type molecules are broken down to smaller compounds. The thereby freed oxygen type functionality's are much more susceptible in forming stable complexes with the later used complexing agents.

Many organic compounds contain functionalities (e.g. amine and alcohol functions) that can be eliminated (e.g. loss of water) to carbon-carbon or carbon-heteronuclear double bond functionalities. Double bonds are much more susceptible for oxidation than the starting functionalities.

From the mechanistical point of view, many oxidations are acid catalyzed reactions.

B) Reasons for oxidizing conditions

In nature, organic compounds are at the end broken down to simpler and more stable molecules by oxidation anyway, via micro biological breakdown if possible, and if not by air oxidation in the long run. The oxidizing conditions in the earth's heliosphere makes oxidized compounds de facto the environmentally most stable ones. The purpose of the oxidative treatment of organic waste in the present process is therefore in essence to take over the burden of which otherwise, by dumping the waste as such, nature has to take charge of. Moreover, there are three more reasons for this in the present process:

1) Highly oxygenated compounds thus formed make stable insoluble complexes with the complexing agents added later in the process.
2) Hazardous chlorinated waste contaminates such as PCB's, chlorinated dioxines and benzofuranes can be dealt with by oxidative dechlorination. For this purpose more extreme conditions (heat, pressure) are necessary than those occurring in the liquid treatment step itself. However, the added oxidants stay in the treated waste until the end of the present process which is a double high pressure and high temperature treatment.
3) The end of the present process is a high pressure polycondensation based iramobilization step in which the prime reagent used is a polyisocyanate. Isocyanate functionality's react with oxygenated organic molecules; these compounds are therefore not only molecularly encapsulated, but also directly impregnated into the polymer matrix.

C) In practice

For acidic treatment of the liquid waste mixture, any strong inorganic acid can be used (e.g. HCl, sulfuric acid, perchlode acid, nitric acid) and any mixture thereof. For oxidative treatment, a combination of one of the above acids with a compatible strong oxidant can be used (e.g. molecular halogens, molecular oxygen and ozone: e.g. highvalent transition metal salts or their acids such as $CrO_3$, $Na_2Cr_2O_7$, $KMnO_4$, $FeCl_3$, ferric sulfate $Fe_2(SO_4)_3$; e.g. peracids and other peroxides such as hydrogen peroxide, performic acid, peracetic acid, perterephthalic acid, perbenzoic acids; e.g. highvalent halogen derived oxidants such as paraperiodic acid, metaperiodic acid, perbromic acid, perchloric acid, and their respective salts; and nitric acid). Some of the mentioned reagents are strong acids as well as strong oxidants, and experiments have indeed shown that there are often the reagents of choice (e.g. nitric acid, perchloric acid). The concentrations used in the process favorably range between 1 and 10% volume.

2. Second treatment of liquid waste: adding of salts of transition metals.

A) Purpose

Adding of transition metal salts to the pretreated liquid waste mixture has two purposes:

1) Many transition metals form thermodynamically stable salts and complexes with the functionality's present in the many different organic and inorganic molecules of the pretreated liquid waste, notably with ligands that coordinate by oxygen, as in phosphates, sulphates, (poly) alcohols etc., and with sulfur-containing functionality's. In most of the cases, these salts and complexes are not water soluble and precipitate in the reaction mixture. This is necessary for an ultimate inclusion in the further described iramobilization procedure.

2) Transition metal complexes and salts catalyze a vast amount of homogeneous and heterogeneous catalytic reactions with the organic molecules present in the waste. The type of the reaction of concern here, which is catalyzed, is the oxidative breakdown of the organic contents to stable oxidated compounds. The oxidant in case may come from the excess oxidant in the pretreatment, or from the highvalent transition metal salt used; catalysts being the added transition metal salt, some of their formed complexes, and the transition metal salts and complexes which are almost inevitably present in the waste itself. As mentioned before, for these reactions more extreme conditions are necessary than those during the treatment of the liquid waste; most of these reactions and their completion only occur at the high pressure and high temperature stages later in the process.

B) In practice

Theoretically, almost any salt of the transition elements can be used for the above purposes. However, in practice the choice is limited by considerations of environmental hazards because of the toxicity of many of these metal salts. Experiments have proven that especially ferrous and ferric chloride, and ferrous and ferric sulfate are the reagents of choice. The concentrations used in the process favorably range between 1 and 10% volume.

3. Third treatment of liquid waste: first treatment with (heavy) metal precipitants.

The liquid waste mixture can be contaminated with almost any kind of heavy metal ion. In order for an as thorough as possible stabilization of the end-material, these metal ions should be converted first into salts or complexes that are not or not very soluble. Most of the metals present are in a high oxidation state because of the acidic and oxidizing conditions in the present process. Depending on the metal ion contents in the waste, several metal ion precipitation reagents, be they pure or impure, and any blend thereof can be used at this stage of the process:

By adding phosphoric acid, many transition metal ions and heavy metal ions, especially those that can attain the $4^+$ oxidation state (in casu Ti, V, Zr, Ru, Hf, Os, Ce, Th, Pa, U, Pu, Am, Sn, Pb) precipitate in the form of insoluble phosphates.

By the addition of boric acid, many metal ions are converted to crystalfine polymeric borates.

Adding of humic acids (allomelamine-type heteropolycondensates resulting form decomposition of organic matter, especially from plants, soils, coals, peat etc.) result in formation of insoluble metal ion chelates.

Any other type of metal ion precipitating reagent can be used at this stage, e.g. natural and synthetic metal ion complexing resins, polysaccharides, polyvinylalcohols, tannins, albumins, aluminium salts, organic and inorganic sulfur containing compounds such as organothiols (e.g. trithiocyanudc acid) and their salts, polyamides, and molecular sieves such as zeolites.

4. Fourth treatment of liquid waste: alkaline conditions, precipitation of most of the metal ions, adding of concrete building additives and other additives.

In this step, the treated liquid waste mixture and the pulverized solid waste mixture (the latter pretreated or not and partially demetalized or not, depending on the type of waste) are brought in a reactor tank and thoroughly mixed in the presence of an excess alkaline reagent.

The purposes are:
  The alkaline conditions cause most of the left-over still soluble metal salts from the liquid pretreatment to be converted to their corresponding insoluble metal hydroxides.
  The pulverized solid waste mixture has, by virtue of the pulverization, an enormous surface. This surface is mostly polyelectrolytic by nature, and is therefore a very effective adsorbent and absorbent for organic molecules and for the multitude of highly dispersed precipitates formed in the process.
  The pulverized solid waste mixtures are also used as an effective water-absorbent. As alkaline reagents, any oxide or carbonate of the Ia and IIa group elements, and any mixture thereof, whether or not powderous, as a suspension or in solution, can be used (e.g. sodium hydroxide, potassium hydroxide, slaked lime, burnt lime, soda lime, calcium carbonate). Experimentally, especially the calcium-type alkaline reagents are the ones of choice, since after reaction,, their newly formed calcium salts are very hygroscopic by nature (e.g. calcium chloride, calcium sulfate), which helps the water regulation of the process. The total free water content is lowered that much so that many partially water soluble salts become over saturated and therefore crystallize out in the medium. This crystallization is fast, and the formed crystals will contain many inclusion compounds.

Upon adding the alkaline reagent, the contents become hot due to the exothermic nature of the ongoing reactions. Higher temperatures help the rate of these reactions.

As for the organic types of reactions taking place from this stage of the process, many of the alkaline catalyzed or alkaline consuming organic reactions (e.g. with leftover ketone, enone, and other unsaturated functionality's which survived the previous treatments) can be speeded up by adding phase transfer catalysts such as quaternary amines and phosphonium salts, polyethers and crown ethers.

Also starting from this stage of the process, concrete-like reactions are taking place, and depending on the kinds of waste used, concrete building waterproofing agents, plasticizers, water reducers, admixtures and additives can be added to improve the partial solidification.

All these reactions are especially speeded up by the next mechanical treatment.

5. Reaction forcing, material compressing and transporting (first high pressure treatment).

The reacting mixture is then fed to a high pressure system (e.g. snail pump, piston pump, extruder, press). A high pressure reaction chamber can be used for three reasons:

Speeding up the ongoing reactions to an as far as possible completion.

The organic and inorganic molecules/precipitates which were adsorbed and absorbed to the surface of the pulverized solid waste mixture are, because of this high pressure, pushed deep into the interior of the solid waste particles. The concrete-like solidification reactions then immobilized the contents to a stable pulp-like situation.

A pressure pump can be used to transport the material to the next reaction tank where the structure forming reagents can be added, or to end-use storage. Indeed, for a number of waste types, the outcome after this treatment is already environmentally stable enough to pass leaching tests as non-hazardous waste (e.g. for landfill).

If pressure is not used, the ongoing reactions described in the previous section can be slower but give in the long run the desired result also. The contents after this stage can also be held as buffer storage before entering into the rest of the process.

6. Post-treatment with heavy metal complexing and precipitating agents.

The outcome of the previous treatment is brought into a second reactor tank for extra treatment with complexing and precipitating agents. This is necessary for several waste types, since it is often the case that these are contaminated with some heavy metal salts that are still soluble after the previous treatment (e.g. salts of the IIb elements: Zn, Cd and Hg). For this purpose, an extra dose of any of the reagents mentioned in the section describing the third liquid waste treatment can be added. At any stage of the process, up to this one, a dose of any mono- and/or polyisocyanate, and any blend thereof, be it pure or impure, can be added to diminish the smell if very pungent waste is to be dealt with. This is a valuable variant when using an open waste processing system.

7. Adding of the polyurethane- or polyureacondensate monomers (structure forming reagents).

At this stage, a dosed quantity of polyurethane- or polyureacondensate monomers, eventually with a polymerization catalyst, is added to and thoroughly mixed with the contents in the reactor tank. The polycondensate monomers that can be used are of two types:

Any di- or polyisocyanate, e.g. toluene-2, 4-diisocyanate, diphenylmethane-4, 4'-diisocyanate, or polyisocyanates derived from polyamines and polyetheramines, be it pure or impure, and any blend thereof.

Any polyalcohol or polyamine, including sugars, polysaccharides, polyvinylalcohols of any chain length, ethanol amines, polyamines or polyetheramines, be it pure or impure, and any blend thereof.

As polymerization catalysts, these can be of ether amine-type, (cyclo)-aliphatic amine type and hydroxyl-containing amine type, and any blend thereof. All of the added compounds at this stage can be industrial waste chemicals too, e.g. chemicals which did not meet the specifications of the producer; normally such compounds are explained in the next section.

8. End-process for forming end-products (second high-pressure treatment).

After adding the polycondensate monomers to the pre-treated waste, the reacting mixture is normally brought as soon as possible to a high pressure system. The reason for this mechanical treatment is manifold; if a high pressure system is not used, the termination of the polycondensation might take several hours, and the molecular stabilization and/or structuralization would not be the same.

The purpose of the high pressure system is to use this as an extreme-condition reaction chamber where a multitude of ionic and radicular reactions with and between the numerous organic and inorganic compounds and reagents present in the material are forced to take place and driven to completion. Next to the high pressure (up to 200 Bar), the cause of the extreme aggressive reaction conditions are the ongoing exothermal polycondensation (which can lead to temperatures up to 200° C.) and the presence of catalysts. Especially the transition metal ions will play a role as catalysts in radical type reorganizations of the molecules in the waste. As stated before, the number of different components in the reacting mixture, certainly at this stage, is so vast that a complete detailed knowledge and understanding of all the ongoing reactions is impossible. However, it is possible to identify several general reaction types that are occurring:

The oxidations, as stated in section IB, are brought to completion.

The high temperature and pressure, in combination with the presence of transition metal salts as radical type catalysts are molecular cracking conditions for organic compounds. By such processes, even normally inert functionality's such as aliphatic chains and chlorinated compounds are reorganized. Since this reorganization is run under oxidizing conditions, the outcome should be highly functionalized molecules which then precipitated or are precipitated by the still present complexing agents and/or impregnated into the polymer matrix (e.g. as end-groups, directly attached to the polymer chain).

When polymerization is run under external addition of high pressure, all the solid (micro) particles are very effectively coated with and encapsulated in the polymer matrix, and completion of all the ongoing reactions towards the inert and stable composite-type end-product takes usually a reaction time less than 10 minutes. A desired result can also be obtained without external addition of pressure: the ongoing reactions in the material, and the high temperature and formed gasses make the material expand so that in any closed reaction chamber internal pressure-build-up is achieved anyway. Moreover, even in an open reaction chamber internal pressure is built-up on a molecular scale; the propagating polymer which is coating and encapsulating the particles shrinks when the polymerization comes to completion, and in this manner the molecularly enclosed particles are pressurized on a molecular scale, making even in this way the desired and above described reactions possible. In the latter case, the obtained result can be pulverized to an environmentally stable powder if appropriate. The actual structural form of the end-product can therefore be, depending on the used end-conditions, anything between a very dense heavy-weight material and an open type light-weight material.

The chemical and/or mechanical conditions at any stage of the described waste handling procedures, and certainly at a last high pressure/temperature treatment, are too drastic for possible survival of any living organism (e.g. worms, insects, viruses, bacteria, fungi) that could be present in the entered waste. Therefor, the end-material is completely sterile. At any stage of the process, up to and including the end procedure, any process malfunction or any end-product discrepancy (e.g. in completion of the ongoing reactions, not neutral rest water, malformation of the end-material, or in any other instance) can be observed visually or otherwise, and the result can be reprocessed if desired.

9. Radioactive waste.

The present and above described waste handling process leads to an environmentally very stable end-product. Any hazardous material which is after processing still present in the end-product, because it cannot be destroyed by chemical means, is very effectively immobilized. This holds especially for heavy metal ions; e.g. cadmium as contaminant in the entered waste will at the end give rise to cadmium as contaminant in the end-material, with the difference that in the latter the heavy metal can not leach out from the material. Therefore, the latter can be safely stored at landfills, without possible hazard for ground and ground water contamination.

The waste-leaching problem, and the solutions therefore, holds a fortiori for radioactive wastes, of which contamination via leaching towards the environmental surroundings can give enormous consequences.

The present and above described process is able to effectively immobilize radioactive wastes. Moreover, the impregnating material will play a role in partially diluting and partially moderating the radioactivity of the entered waste towards lower levels in the end-material.

10. Uses of the end-material.

As stated before, the present process converts all kinds of waste into an environmentally stable composite-type end-material which can be safely deposited at landfills. However, the recycled composite raw material is a valuable resource in its own fight and can be manufacture into a wide range of commercial products for construction purposes, e.g. inside and outside wall coverings, road construction material, soundproof walls, acid or oil proof and dito repellent materials, insulation panels, drain constructions., salt filters, sports facilities, fireproof or fire compartmentation panels, ground surface engineering and including all products from extrusion and structure forming.

The process can be used for clean-up of contaminated soil of any kind, be it previous hazardous waste-dumps, contaminated soil in the neighborhood of gasoline stations or chemical or metal processing industries, or shore oil contamination after an oil tanker disaster; in this case the processed soil can be reused as non contaminated soil if appropriate.

11. Energy storage blocks.

Normally, the outcome of the present process is an inflammable end-product if any kind of waste is entered. However, if wastes of high caloric value (e.g. plastics that will burn such as polyethylene, polyethyleneterephthalate, polystyrene, polyesters, e.g. tires, wood, cotton, textiles, carpets, organic solvents and chemicals that will burn) are used for processing, the end-material will be combustible, and will still have a high caloric value. Moreover, when solid waste containing free metals, e.g. Zn, Cu, Ni, Co, Fe etc. is used together with the above high caloric waste in the present process, the outcome is an end-material with special burning properties. Upon burning at high temperatures, the water enclosed in the material is released and will react with the free metals, thereby oxidizing these metals with formation of hydrogen gas, which at its turn is then burned (oxidized to water) with extra release of energy. Therefore, such material should burn faster.

This material can be processed into bricks of any size which can be stored, transported and used as household, industrial or incinerator or any power station fuel replacement, thereby recuperating the energy content of the original waste.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

We claim:

1. A process for the treatment of waste products, of the type comprising:
   first, separating liquid and solid waste products; and
   second, adding a means for formation of a polymeric matrix such that said waste products are absorbed in the chain of said polymeric matrix; characterized by:
   prior to said second step, further dividing said liquid wastes into a first group of liquids with a pH-value of 7 at the most, and a second group of liquids with a pH-value higher than 7;
   (a) preparing a first mixture by adding to the first group of liquids:
      (i) pH adjusting means sufficient to produce a resulting pH-value of no more than 5;
      (ii) oxidant; and
      (iii) metallic precipitating means sufficient to precipitate metals;
   (b) preparing a second mixture of said solid waste products and liquid of said first mixture; and
      adding pH adjusting means sufficient to produce a resulting pH-value of at least 8 in the second mixture;
   (c) preparing a third mixture of said second group of liquids and the second mixture;
      (i) allowing the second group of liquids and second mixtures to react; and
      (ii) adding pH adjusting means sufficient to produce a resulting pH-value of at least 7; and
   wherein, said means for formation of a polymeric matrix of said second step are added to said third mixture.

2. The process of claim 1, further comprising: prior to said second step, compressing said third mixture under a pressure of at least 25 Bar.

3. The process of claim 1, further comprising, after said second step, pressing said waste products into a plate.

4. A process for chemical, thermal and mechanical treatment of wastes, wherein said wastes include a comminuted solid waste portion and a liquid waste portion, comprising:
   forming a first mixture by combining said liquid waste portion, inorganic acid, and an oxidant;
   forming a second mixture of said comminuted solid waste portion and said first mixture; and
   forming a third mixture of said second mixture and a phase transition catalyst.

5. The process of claim 4, wherein said phase transition catalyst is selected from the group consisting of quaternary amines, phosphonium salts, polyethers, crown ethers, and any mixture thereof.

6. The process of claim 4, wherein said inorganic acid is selected from the group consisting of HCl, sulfuric acid, perchloric acid, nitric acid, and any mixture thereof; and
   said oxidant is selected from the group consisting of molecular halogens, molecular oxygen and ozone, highvalent transition metal salts or their acids, $CrO_2$, $Na_2Cr_2O_7$, $KMnO_4$, $FeCl_3$, $Fe_2(SO_4)_3$, peracids and other peroxides, hydrogen peroxide, performic acid, peracetic acid, perterephthalic acid, perbenzoic acids, highvalent halogen derived oxidants, paraperiodic acid, metaperiodic acid, perbromic acid, and any mixture thereof.

7. The process of claim 4, wherein said step of forming a second mixture further comprises:
   mixing said first mixture with an alkaline reagent.

8. The process of claim 7, wherein said alkaline reagent is selected from the group consisting of an oxide or carbonate of the group Ia and IIa elements, sodium hydroxide, potassium hydroxide, slaked lime, burnt lime, soda lime, calcium carbonate, and any mixture thereof.

9. The process of claim 4, wherein said step of forming a first mixture further comprises:
   mixing said liquid waste portion with a precipitating reagent comprising a salt of a transition metal element.

10. The process of claim 9, wherein said salt of a transition metal element is selected from the group consisting of ferrous and ferric chloride, ferrous and ferric sulfate, and any mixture thereof.

11. The process of claim 4, wherein said step of forming a first mixture further comprises:
    mixing said liquid waste portion with a metal precipitating agent.

12. The process of claim 11, wherein said metal precipitating agent is selected from the group consisting of phosphoric acid, boric acid, humic acids, natural and synthetic metal ion complexing resins, polysaccharides, polyvinylalcohols, tannins, albumins, aluminum salts, organothiols, trithiocyanuric acid, polyamides, molecular sieves, and zeolites, or any mixture thereof.

13. The process of claim 11, further comprising: subjecting said third mixture to pressure in the range from 10 to 200 Bar.

14. The process of claim 4, wherein said step of forming said third mixture further comprises:
    mixing said second mixture with concrete additives selected from the group consisting of waterproofing agents, plasticizers, water reducers, and any mixture thereof.

15. The process of claim 4, wherein said step of forming said third mixture further comprises:
    mixing said second mixture with structure forming reagents.

16. The process of claim 15, wherein said structure forming reagents are selected from the group consisting of di- or polyisocyanate, toluene-2,4-diisocyanate, diphenylmethane-4,4'-diisocyanate, a polyisocyanate derived from polyamines and polyetheramines, a polyalcohol, a polyamine, sugars, polysaccharides, polyvinylalcohols, ethanol amines, polyetheramines, and any mixture thereof.

17. The process of claim 15, further comprising:

mixing a polymerization catalyst to said second mixture and structure forming reagents.

18. The process of claim 17, wherein said polymerization catalyst is selected from the group consisting of an amine-type catalyst, (cyclo)-aliphatic amine type catalyst, hydroxyl-containing amine type catalyst, and any mixture thereof.

19. The process of claim 15, further comprising: applying pressure in the range from 10 to 200 Bar to said mixture of second mixture and structure forming reagents.

20. A process for the treatment of waste products, of the type comprising:

first, separating liquid and solid waste products; and second, adding a means for formation of a polymeric matrix such that said waste products are absorbed in the chain of said polymeric matrix; characterized by:

prior to said second step, further dividing said liquid wastes into a first group of liquids with a pH-value of 7 at the most, and a second group of liquids with a pH-value higher than 7;

(a) preparing a first mixture by adding to the first group of liquids:

(i) pH adjusting means sufficient to produce a resulting pH-value of no more than 5;

(ii) oxidant; and (iii) metallic precipitating means sufficient to precipitate metals;

(b) preparing a second mixture of said solid waste products and liquid of said second group; and adding pH adjusting means sufficient to produce a resulting pH-value of at least 8 in the second mixture;

(c) preparing a third mixture of said first mixture and the second mixture;

(i) allowing the first and second mixtures to react; and (ii) adding pH adjusting means sufficient to produce a resulting pH-value of at least 7; and wherein, said means for formation of a polymeric matrix of said second step are added to said third mixture.

* * * * *